US011336098B2

(12) United States Patent
Gupta et al.

(10) Patent No.: US 11,336,098 B2
(45) Date of Patent: May 17, 2022

(54) INTERCONNECTION OF MULTIPLE RENEWABLE ENERGY POWER PLANTS

(71) Applicant: VESTAS WIND SYSTEMS A/S, Aarhus N (DK)

(72) Inventors: Manoj Gupta, Singapore (SG); Ravi Kumar, Sengkang (SG); Kouroush Nayebi, Ikast (DK); Vajira Suminda Ganepola, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 341 days.

(21) Appl. No.: 16/307,099

(22) PCT Filed: May 31, 2017

(86) PCT No.: PCT/DK2017/050181
§ 371 (c)(1),
(2) Date: Dec. 4, 2018

(87) PCT Pub. No.: WO2017/215719
PCT Pub. Date: Dec. 21, 2017

(65) Prior Publication Data

US 2020/0313440 A1 Oct. 1, 2020

(30) Foreign Application Priority Data

Jun. 13, 2016 (DK) ............................ PA201670425

(51) Int. Cl.
*H02J 3/38* (2006.01)
*H02J 13/00* (2006.01)
*H02J 3/46* (2006.01)

(52) U.S. Cl.
CPC ................ *H02J 3/381* (2013.01); *H02J 3/46* (2013.01); *H02J 13/00002* (2020.01);
(Continued)

(58) Field of Classification Search
CPC ................ H02J 3/381; H02J 13/00006; H02J 13/00002; H02J 3/46; H02J 2300/28; H02J 2310/18; H02J 2300/40; H02J 2300/24
See application file for complete search history.

(56) References Cited

U.S. PATENT DOCUMENTS

2009/0160187 A1* 6/2009 Scholte-Wassink .... F03D 7/048 290/44
2010/0109447 A1* 5/2010 Achilles ................. H02J 3/381 307/153
(Continued)

FOREIGN PATENT DOCUMENTS

CN 101725480 A 6/2010
CN 105515014 A 4/2016
(Continued)

OTHER PUBLICATIONS

Danish Patent and Trademark Office First Technical Examination for Patent Application No. PA 2016 70425 dated Dec. 2, 2016.
(Continued)

*Primary Examiner* — Daniel Cavallari
*Assistant Examiner* — Brian K Baxter
(74) *Attorney, Agent, or Firm* — Patterson + Sheridan, LLP

(57) ABSTRACT

A power plant control system for a first renewable energy power plant comprising one or more renewable energy generators. The power plant control system comprises receiving means for receiving a power delivery demand from a transmission grid operator; control means configured to control the one or more renewable energy generators of the first renewable energy power plant so as to supply power that targets the received power delivery demand; and communication means configured to transmit a request to one or more further renewable energy power plant control systems
(Continued)

to request operation of one or more power compensation units associated with respective ones of the further renewable energy power plants.

16 Claims, 3 Drawing Sheets

(52) U.S. Cl.
CPC ..... *H02J 13/00006* (2020.01); *H02J 2300/24* (2020.01); *H02J 2300/28* (2020.01); *H02J 2300/40* (2020.01); *H02J 2310/18* (2020.01)

(56) References Cited

U.S. PATENT DOCUMENTS

2010/0152910 A1* 6/2010 Taft ........................ G01D 4/002 700/286
2010/0264666 A1* 10/2010 Bo ............................ H02J 3/26 290/55
2010/0299270 A1 11/2010 Maglaque
2011/0196546 A1* 8/2011 Muller .................... H02J 3/381 700/295
2011/0221269 A1* 9/2011 Borger .................... H02J 3/386 307/26
2012/0083935 A1* 4/2012 Wells ...................... H02J 3/381 700/292
2012/0139241 A1* 6/2012 Haj-Maharsi ........... H02J 3/381 290/44
2012/0150679 A1 6/2012 Lazaris
2013/0124001 A1* 5/2013 Bhageria ........... H02J 13/00017 700/296
2013/0272844 A1* 10/2013 Lobato Pena ............. F03D 9/25 415/1
2014/0042818 A1* 2/2014 Blacha ...................... H02J 1/00 307/77
2014/0062086 A1* 3/2014 Mata Dumenjo ......... F03D 7/00 290/44
2014/0142771 A1* 5/2014 Nielsen ..................... H02J 7/34 700/291
2014/0142779 A1* 5/2014 Stoettrup ................ H02J 3/382 700/297
2015/0073610 A1 3/2015 Schnetzka et al.
2015/0137520 A1* 5/2015 Garcia .................. F03D 7/0284 290/44
2015/0184640 A1* 7/2015 Fortmann ............... F03D 9/257 290/44
2015/0340870 A1* 11/2015 Ilo ............................ H02J 4/00 307/24
2015/0381089 A1* 12/2015 Tarnowski ................ H02J 3/24 307/84
2016/0299187 A1* 10/2016 Liang ................... G01R 31/086
2017/0338652 A1* 11/2017 Ubben .................... H02J 3/386
2019/0055926 A1* 2/2019 Busker .................. F03D 7/0284

FOREIGN PATENT DOCUMENTS

| | | | |
|---|---|---|---|
| CN | 105659461 | A | 6/2016 |
| GB | 2410386 | A | 7/2005 |
| GB | 2515358 | A | 12/2014 |
| WO | 2013167142 | A1 | 11/2013 |
| WO | 2016070882 | A1 | 5/2016 |
| WO | 2017215719 | A1 | 12/2017 |

OTHER PUBLICATIONS

PCT Notification of Transmittal of The International Search Report and The Written Opinion of the International Searching Authority, or the Declaration for Application No. PCT/DK2017/050181 dated Nov. 9, 2017.

European Patent Office Examination Report for Application 17730662.8-1202 dated Jul. 9, 2020.

Chinese Office Action for Application 201780036716.9 dated Jun. 30, 2021.

Chinese Patent Office, Second Office Action for Chinese Application 201780036716.9 dated Oct. 22, 2021.

Chinese Patent Office, Third Office Action for Application 201780036716.9 dated Feb. 11, 2022.

* cited by examiner

INTERCONNECTION OF MULTIPLE RENEWABLE ENERGY POWER PLANTS

TECHNICAL FIELD

The invention relates to the operation of a power plant control system in a power distribution network and has particular application to the operation of a power plant control system of a wind energy power plant, and renewable-energy power plants more generally.

BACKGROUND TO THE INVENTION

Penetration of wind power and other renewal forms of energy is increasing. It is now common for newly commissioned wind power plant installations to be able to regulate the power that they provide to the grid. A Transmission System Operator (TSO) governs the connection requirements of wind power plants into the grid and defines voltage and power characteristics to which the wind power plant must comply at a point of interconnection (POI) with the grid. The connection requirements may comprise the grid code requirements. A wind power plant is a group of electricity producing wind turbine generators situated in the same geographical location. It is also known as a wind park or a wind farm.

The operation of a wind power plant is controlled by a power plant control system or power plant controller (PPC). The PPC functions to receive power delivery demands from a TSO in response to which the PPC determines appropriate active (P) and reactive power (Q) references or 'set points' to transmit to the wind turbines under its control. PPCs are operable to monitor the grid at the output of the power plant to ensure that these electrical parameters are consistent with the performance demanded by the TSO. For active power control, wind turbines in a power plant may be operated in a curtailed mode so they can be run up to full active power delivery as and when required. For reactive power control, wind turbines may supply extra reactive power up to a maximum level as governed by the operation of the converter systems used in those wind turbines. However, further reactive power control may be provided by additional equipment provided at a substation of an associated power plant, such as capacitor banks, shunt reactors, or static compensators (STATCOMs).

Due to large scale integration of renewable energy resources into the transmission system, particularly wind power plants, grid management is becoming more complex for TSOs. For instance, substations associated with such power plants tend to be remote from the main transmission grid which introduces delay in the commands sent from the TSOs to the power plants. Furthermore, high number of power plants being controlled by a TSO can mean that the control is less accurate since corrective measures cannot be carried out rapidly enough to ensure system stability. Also, even where multiple wind power plants are connected to the grid in a reasonably compact geographical area, all of those plants require at least reactive compensation equipment. This increases the cost of wind power plants which has an upwards pressure on the costs of power generation.

It is against this background that the embodiments of the invention have been devised.

SUMMARY OF THE INVENTION

In a first aspect, the invention provides a power plant control system for a first renewable energy power plant comprising one or more renewable energy generators. The power plant control system comprises:

- receiving means for receiving a power delivery demand from a transmission grid operator;
- control means configured to control the one or more renewable energy generators of the first renewable energy power plant so as to supply power that targets the received power delivery demand;
- and communication means configured to transmit a request to one or more further renewable energy power plant control systems to request operation of one or more power compensation units associated with respective ones of the further renewable energy power plants.

The invention extends to and also embraces a power system comprising a first renewable energy power plant and one or more further renewable energy power plants, wherein the first renewable energy power plant includes a power plant control system as defined above.

The invention has particular utility to wind power plants, but also applies to other types of renewable energy power plants, for example photo-voltaic power plants, hydro-electric power plants and the like.

The invention also resides in a method of operating a first renewable energy power plant, comprising:

- receiving a power delivery demand from a transmission grid operator;
- controlling one or more renewable energy generators of the first renewable energy power plant so as to supply power that targets the received power delivery demand; and
- transmitting a request to one or more further renewable energy power plants to request operation of one or more power compensation units associated with respective ones of the further renewable energy power plants.

The invention also may be expressed as a computer program product downloadable from a communications network and/or stored on a machine readable medium, comprising program code instructions for implementing a method as defined above.

An advantage provided by the embodiments of the invention is that the power plant control system of the first renewable energy power plant has the functionality to manage the power delivery across multiple power plants, and therefore acts as an energy management system, able to active assets of other power plants so as to react quickly to any grid instabilities that may be detected. This provides a robust response to grid instabilities.

In the illustrated embodiment, the first renewable energy power plant also comprises power compensation units, wherein the power plant control system is operable to control said power compensation units.

Beneficially, the communication means permits communication between the power plant control system of the first renewable energy power plant, and respective power plant control system of the one or more further renewable energy power plants. In one embodiment, the first renewable energy power plant and the one or more further renewable energy power plants are coupled to the same collector bus by respective feeder lines. Alternative embodiments are envisaged, however, where the power plants are coupled to a distribution grid by separate feeder/transmission lines, and not through a common collector bus.

The one of more power compensation units may comprise one or more of the following: a capacitor bank; a reactor bank; a static compensator (STATCOM), an online tap changer transformer, and a device for initiating low power production mode of an associated power plant.

In one embodiment, the system may include voltage detection means comprising at least a first voltage measuring device for measuring the voltage at the first renewable energy power plant and one or more further voltage measuring devices for measuring voltages at respective ones of the further renewable energy power plants. Therefore, the power plant control system may be operable to monitor the voltages at the or each further renewable energy power plant; monitor an active power demand from the transmission grid operator; and send a request message via the communication means to one or more of the further renewable energy power plants to activate capacitor banks associated therewith.

The power plant control system may also be operable to monitor the voltage at the first renewable energy power plant; to detect a low voltage event; and, in response, to send a request message via the communication means to one or more of the further renewable energy power plants to activate capacitor banks associated therewith. Furthermore, the power plant control system may be operable to monitor the voltages at the or each further renewable energy power plant; monitor an active power demand from the transmission grid operator; and send a request message via the communication means to one or more of the further renewable energy power plants to change a tapping point of respective online tap changer transformers associated therewith.

In other embodiments, the power plant control system may comprise phasor measurement means comprising at least a first phasor measurement unit for measuring electrical phasor parameters at the first renewable energy power plant and one or more further phasor measurement units for measuring electrical phasor parameters at respective ones of the further renewable energy power plants. Accordingly, the power plant control system may be operable to monitor the phasor measurement means, to determine the presence of a grid fault, and in response to send a request message via the communication means to one or more of the further renewable energy power plants to initiate a low power production mode of the power generation units associated therewith.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that matter.

BRIEF DESCRIPTION OF THE DRAWINGS

So that it may be more fully understood, the invention will now be described, by way of example only, with reference to the following drawings, in which.

DETAILED DESCRIPTION OF EMBODIMENTS OF THE INVENTION

Figure 1:
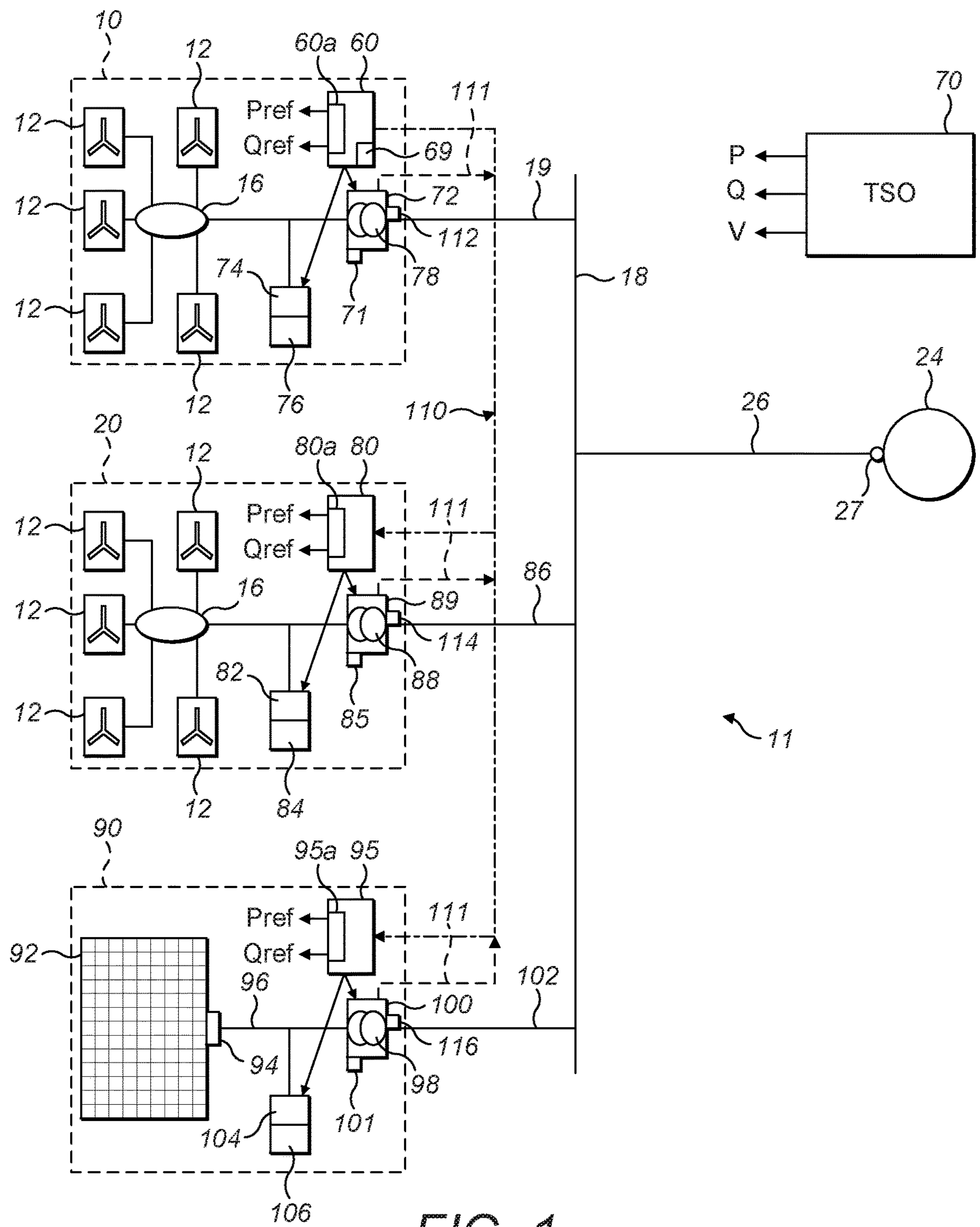
FIG. 1 is a schematic diagram of a power generation network, including a plurality of renewable energy power plants that are configured to supply power to a power transmission grid.

Embodiments of the invention provide methods and techniques for operating a power plant control system of a renewable energy power plant, particularly a wind power plant, so as to regulate power delivery to a power network in order to meet grid interconnection demands. Conventionally, wind power plants are connected to a regional or national power distribution grid by a dedicated transmission line and are operationally separate from one another. That is, the power plant control system of one wind power plant has no influence over the operation of another wind power plant. Power plant control systems associated with those respective power plants may therefore be equipped with control strategies for controlling the power output of the power plant in order to regulate the power injected into the distribution grid at the point of interconnection, or POI, at which the transmission line connects to the distribution grid. This ensures that the actual power delivered by the power plant at the POI meets the grid code requirement that are dictated by a transmission system operator, or TSO, associated with the distribution grid.

In practical terms, controlling the wind turbines of a power plant might involve providing reference values for voltage (V), active power (P) and reactive power (Q) for each of the wind turbines populating the power plant. Such reference values may be dispatched by a dispatcher of the power plant control system as would be well understood by those skilled in the art. The reference values dispatched may be the same for all of the wind turbines in the power plant, taking account of any non-operational wind turbines, as appropriate, or the reference values may be determined for each wind turbine specifically based on a calculation that takes into account issues such as the operating capacity of the wind turbine, wind conditions prevailing at the specific site or each wind turbine, the requirement for energy storage, and so on.

Government policies have in part driven the increasing penetration of wind power into the power generation mix in the UK and worldwide. The planning and commissioning of large numbers of wind power plants of various capacities, and also other forms of renewal power generation such as photo-voltaic (PV) plants and even wave-energy plants, means that it is not necessarily appropriate, possible, or economically viable to connect each of those power plants to the distribution grid by its own dedicated transmission line. Instead, it may be desirable for multiple power plants to feed in to the distribution grid by way of a common transmission line. So, multiple renewable energy power plants may be coupled to an electrical network to provide access to the common transmission line. Such an electrical network may be referred to as a collector bus or grid, or also a local grid. Such a collector bus may be a single cable, for example a subterranean cable, or may be more than one cable connected by common transmission lines, for example overhead transmission lines. However, typically an entire collector bus would be at the same bus voltage.

A challenge of this type of infrastructure is that the multiple power plants coupled to the collector bus may have different capacities, may be operated by different power companies, and may comprise turbines from different manufacturers. Therefore, this mix is challenging in terms of ensuring that the power delivery at the POI of the common transmission line to the distribution grid meets the grid specification. Determining how a wind power plant should be operated to accommodate this complicated mix of operational issues is not straightforward.

In the discussion that follows, an example layout of a power network will be described in which multiple renewable energy power plants, including wind power plants and PV plants, by way of non-limiting examples, are connected to a common point or bus, and are thereafter connected to a main power transmission or power distribution grid by a common transmission line. Suitable control strategies will also be explained that may be implemented by one of the power plant control systems associated with a respective wind power plant in order to regulate more effectively the power characteristics delivered at the point of interconnection with the main transmission grid in order that those power characteristics or, more simply 'delivered power', match more closely the grid specification set by a grid operator, or which may be needed to support grid stability.

With reference now to FIG. 1, an example of a wind power plant 10 in a wider power network 11 is shown to which control concepts according to embodiments of the invention may be applied. The example shown is representative only and the skilled reader will appreciate that the methods, systems and techniques described below may be applicable to many different configurations of power networks. Moreover, the components of the wind power plant 10 are conventional and as such would be familiar to the skilled reader, and so will only be described in overview.

The wind power plant 10 shown in FIG. 1 includes a plurality of wind turbine generators 12 or more simply 'wind turbines', but a single wind turbine would also be possible. The wind turbines 12 are connected to a plant-level power network or 'grid' 16 which, in turn, is connected to a collector bus 18 via a first feeder line 19. The collector bus 18 provides a point of common coupling (PCC) for a plurality of wind power plants, although only a second wind power plant 20 is shown in FIG. 1. The collector bus 18 may be at an intermediate voltage level that is suitable for relatively short distance power transmission, for example in the region of 10-150 kV, most usually between 110 and 150 kV.

The collector bus 18 is connected to a power transmission grid 24 by a transmission line 26 at a point of interconnection 27. Whereas the collector bus 18 may be configured to network different power plants, and so may be required to span distances up to around 100 km, the transmission grid 24 may be a regional- or national-level network and so may be required to span distances of up to around 250 km or more. Accordingly, the voltage level of the transmission grid 24 may be much higher than the voltage level of the collector bus 18 for better transmission efficiency. To put this in context, transmission grids are usually operated in the order of up to and even above 300 kV (usually 150-400 kV). It should be noted that transformers that would be necessary to step up the voltages between the collector bus 18 and the transmission line 26 are not shown here, but their presence is implied.

Figure 2:
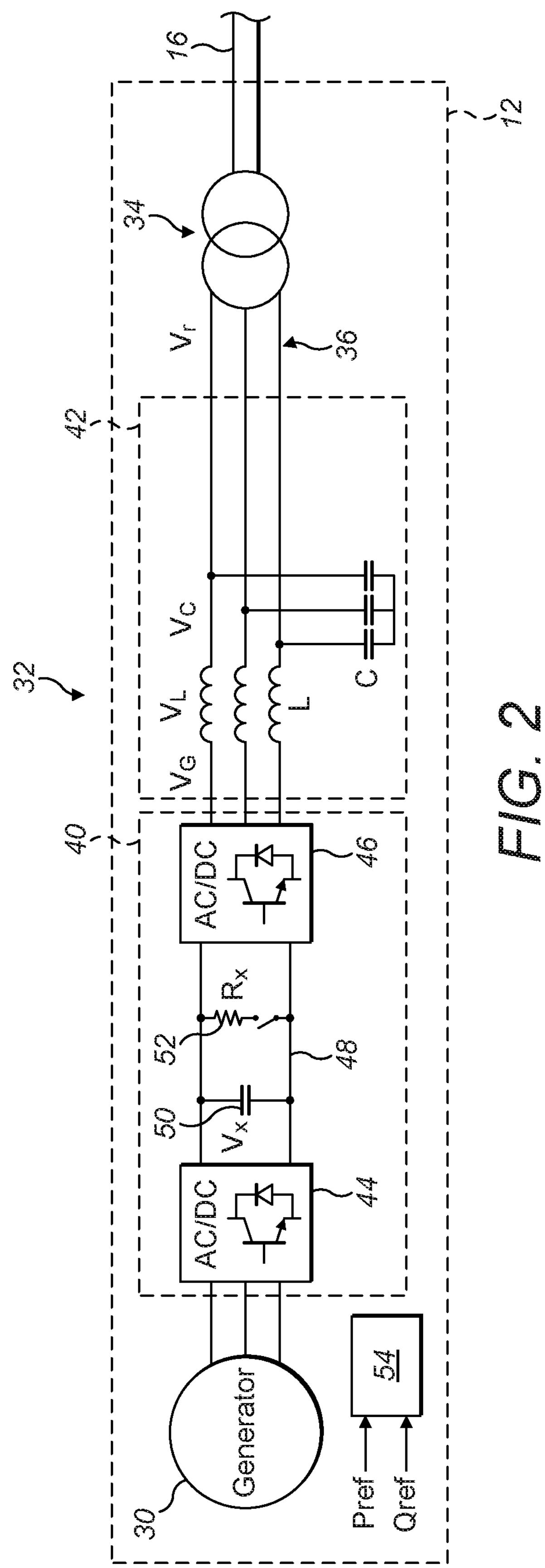
FIG. 2 is a schematic diagram showing the a wind turbine of a wind power plant of FIG. 1 in more detail.

Although FIG. 1 is in general a high-level schematic to illustrate the main items in the power network 11, one of the wind turbines 12 of the wind power plant 10 is shown schematically in FIG. 2 for completeness, and will now be described here. The wind turbine 12 comprises a generator 30 that is driven by a rotor (not shown) to produce electrical power that is transmitted through a power converter system 32 to a coupling transformer 34 via a low voltage link 36.

Electrical power produced by the generator 30 is delivered to the plant-level power network 16 through the coupling transformer 34 which functions to step up the voltage generated by the power system 32 (typically a line voltage in the order of 400-500V) to a voltage that matches the voltage of the plant-level power network 16.

The power produced in the generator 30 is three-phase AC, but is not in a form suitable for delivery to the plant-level power network 16, in particular because it is typically not at the correct frequency or phase angle. Accordingly, the power converter system 32 includes a power converter 40 and a filter 42 disposed between the generator 30 and the coupling transformer 34 to process the generator output into a suitable waveform having the same frequency as the plant-level power network 16 and the appropriate phase angle.

The AC output of the power converter 40 is fed to the coupling transformer 34 by way of the low voltage link 36. Typically the low voltage link 36 will have a line voltage of below about 1 kV, by way of example. The low voltage link 36 is depicted here as comprising three lines, reflecting the fact that it is a three-phase system. The power output of the power converter 40 is conditioned by the filter 42, represented here by a suitable inductor/capacitor network, to provide low-pass filtering for removing high frequency noise from the AC waveform.

Modern wind turbines may have different architectures, so the following discussion should be considered to be by way of example only. In the illustrated example, the power converter 40 has a full-scale back-to-back power converter architecture which is known generally in the art. As such, the power converter 40 provides full-scale AC to AC conversion by feeding electrical current through an AC-DC converter 44 and a DC-AC converter 46 (also known as an inverter). The AC-DC converter 44 is connected to the DC-AC converter 46 by a conventional DC link 48, which includes a capacitor 50 providing smoothing for the DC output and a switched resistor 52 to act as a dump load to enable excess energy to be discharged if operational circumstances dictate that it is necessary. The smoothed DC output of the AC-DC converter 44 is received as a DC input by the DC-AC converter 46 which generates a three-phase AC output for delivery to the coupling transformer 34. As an example, another suitable architecture for a utility-scale wind turbine would be a doubly-fed induction generator (DFIG) converter system. As the skilled reader will appreciate, the DC-AC converter 46 is configured to provide a level of control over the characteristics of the AC power produced, for example to regulate the voltage (V), the active power (P) and the reactive power (Q) delivered by the wind turbine to the plant-level network 16 and, thus, to the collector bus 18. From a practical point of view, it is DFIG (also known as Type 3) and Full-scale converter (also known as Type 4) wind turbines that are used in commercial-scale wind power generation, and to which this discussion relates.

Noting that the magnitude, angle and frequency of the output of the wind turbine 12 is dictated by grid requirements set by a TSO, and that the voltage is set at a substantially constant level in accordance with the specifications of the low voltage link 36, in practice only the current of the AC output is controlled, and a wind turbine controller 54 is provided for this purpose. The wind turbine controller 54 is configured to receive target values for the active power $P_{REF}$ and the reactive power $Q_{REF}$ contained in the AC output, and to adjust the AC output accordingly. As is known, the values of $P_{REF}$ and $Q_{REF}$ are transmitted or 'dispatched' to the wind turbine controller 54, by a power plant control system 60 of the wind power plant 10. It should be noted that the power plant control system 60 may be implemented by a suitable configuration of hardware and software in order to achieve its required control objectives. Moreover, it may be implemented as a specifically designed hardware module comprising suitable processors, memory modules and interfaces, or it may be implemented as a general purpose computer. In either case, the computing units or controllers may be implemented to run suitable software algorithms to carry out the functionality that will be described below and so will be provided with appropriate hardware and memory.

Returning to FIG. 1, it will be appreciated that the operation of the wind power plant 10 is responsive to the demands of a Transmission System Operator (TSO) 70. In particular, the TSO 70 will transmit to a receiving means or receiver 69 of the power plant control system 60 target values of voltage (V), active power (P) and reactive power (Q) which the power plant control system 60 must try and meet when it controls the wind turbines 12 to deliver power to the plant-level power network 16 and, from there, to the collector bus 18 via collector substation 72.

In response to the demands placed on it by the TSO 70, the power plant control system 60 is operable to interpret the target voltage and power references and dispatch corresponding reference values ($V_{ref}$, $P_{ref}$ and $Q_{ref}$) to each of the wind turbines 12 in the power plant 10 by way of a dispatching module 60*a* which acts as a control means for controlling the wind turbines 12.

The power plant control system 60 is also operable to control power compensation assets or devices that provide a further degree of control over the active power, reactive power and voltage that the power plant control system 60 is able to deliver to the collector bus 18. In this embodiment, the power compensation devices include one or more reactor banks 74, one or more capacitor banks 76, and a transformer 78 which is provided with online tap changer (OLTC) functionality. Other devices are possible such as static compensators (STATCOMs). The reactor/capacitor banks 74, 76 and the transformer 78 may be located at or in the vicinity of the substation 72 of the power plant 10. Note also that although the power plant control system 60 is shown as separate from the substation 72 in FIG. 1, this is merely so that the individual components are clear and, in fact, the power plant control system 60 may be located within the substation 72.

To illustrate an example of how the power plant control system 60 may operate, in response to the TSO 70 increasing the reactive power reference $Q_{ref}$, the power plant control system 60 may take the decision to operate its capacitor bank 76 in order to increase reactive power if the power plant 10 has no additional capacity to increase reactive power through operation of the wind turbines alone. By way of further example, in the event that the power plant control system 60 detects a drop of reactive power on the collector bus 18, it may act to increase the reactive power delivered to the collector bus 18 by operating the capacitor bank 76.

In addition to the functionality described above which the power plant control system 60 implements to control its own power generation and power compensation assets, such as the wind turbines 12, reactor bank 74, capacitor bank 76 and OLTC 78, to deliver the target power delivery to the collector bus 18 and to help maintain the stability of the system, the power plant control system 60 is also operable to engage with power compensation assets of other power plants. Thus, the power plant control system 60 can therefore activate, or cause to be activated, power compensation devices, including generating units, of other renewable energy power plants in the network in order to achieve certain power delivery objectives, for example in order to provide more reactive power of the collector bus 18 than it can provide on its own so as to support the stability of the collector bus 18.

Referring again to FIG. 1, it will be appreciated that the second wind power plant 20 is substantially the same as the first wind power plant 10 in that it comprises a plurality of wind turbines 12 and an associated power plant control system 80 which dispatches active and reactive power references to the wind turbines via a dispatching module 80*a*. Furthermore, the second wind turbine power plant 20 comprises respective power compensation devices include one or more reactor banks 82, one or more capacitor banks 84, and a transformer 88 which is provided with online tap changer (OLTC) functionality. In this embodiment the OLTC transformer 88 is shown within the boundary of a substation 89, although this is not essential, and the reactor/capacitor banks 82,84 may also be contained within the substation 89. Here, the second wind power plant 20 is shown as being connected to the collector bus 18 by a second feeder line 86.

In addition to the second wind power plant 20, the power network 11 is shown as also including a photo-voltaic (PV) power plant 90 which is also coupled to the collector bus 18. In more detail, the PV power plant includes a PV array 92, as is generally known in the art, which is coupled via a power inverter 94 to a low voltage AC transmission line 96. A PV plant control system 95 serves to control the operation of the power inverter 94. In order to increase the voltage of the low voltage AC transmission line 96 to a voltage that is suitable for the collector bus 18, the delivered power is provided to a transformer 98, which may have OLTC functionality, at a substation 100. From the substation, the PV power plant 20 is coupled to the collector bus 18 by a third feeder line 102.

The PV power plant control system 95 has a degree of flexibility to determine the voltage (V), reactive power (P) and reactive power (Q) that the PV power plant 90 provides to the collector bus 18 by virtue of the functionality of the power inverter 94. However, the PV power plant 90 in this embodiment is also provided with power compensation devices to provide it with further capacity to control the generated active and reactive power balance so that it can assist in supporting the stability of the grid, as required. Here, in a similar way to the wind power plants 10, 20 of the power network 11, the PV power plant 90 also comprises a reactor bank 104 and a capacitor bank 106, in addition to the OLTC functionality of the transformer 98.

It should be noted that each of the second wind power plant 20 and the PV power plant 90 is able to operate independently to deliver power to the collector bus 18 in accordance with the power reference requirements transmitted to the control systems by the TSO 70.

However, here it should be appreciated that the operation of elements of all of the renewable energy power plants 10, 20, 90 are interlinked by a communication system 110. In FIG. 1 the communication system 110 is illustrated by a dashed line that extends from the power plant control system 60 of the first wind power plant 10, to the power plant control system 80 of the second wind power plant 20, and also the PV power plant control system 95 of the PV power plant 90.

The communication system 110 comprises suitable computing equipment at each of the power plant control systems to provide an electronic interface to the system 110, together with a communications link between those interfaces. The communications link may be a wired link, for example in the form of a wide area network (WAN), or may be wireless using a suitable messaging protocol over a cellular telecommunications network or dedicated point to point communications system. In addition, or alternatively, the communication system 110 may be connected to the various substations of each of the power plants. Information can therefore be retrieved from the substations directly by the power plant control system 60, acting as a 'master controller' or indirectly via each of the control systems of the respective power plants. It is known that substations include suitable components of a supervisory control and data acquisition (SCADA) system to allow them to communicate with external systems such as TSOs. Thus, the same SCADA communication components may be used to feed substation information to the communication system 110, as indicated by dashed lines 111.

By virtue of the communication system 110, the first power plant control system 60 is able to transmit control request messages to the power plant control system 80 of the second wind power plant 20, and also the PV power plant control system 95 of the PV power plant 90 to gain control of their power compensation assets. This provides the first power plant control system 60 an enhanced ability to meet its power delivery objectives and, in particular, to support the stability of the collector grid 18 and, more broadly, the power transmission grid 24.

In this way, the first power plant control system 60 is able to function in a similar way to a micro-grid controller since it is able to demand reactive power to be delivered from its neighbouring wind power plant or PV power plant and furthermore can request operation of the reactor banks and capacitor banks of those power plants which supports the delivery of increased active power into the grid. Beneficially, therefore, the power plant control system 60 acts as an energy management system since it has the functionality to manage the power delivery across multiple power plants. Due to the relatively close proximity of the power plants 10,20,90, the communication system 110 can be configured to provide relatively high speed communications which allows the first power plant control system 60 to react quickly to any grid instabilities that it detects. This provides a more robust response to grid instabilities than would be the case if each of the power plants was acting along in response to commands from the TSO 70. It will be appreciated that commands from the TSO 70 would generally be transmitted over a SCADA system.

To illustrate the functionality provided by the embodiments of the invention, a number of operational scenarios will now be described.

Controlling Reactive Power Output from Nearby Power Plant

As shown in FIG. 1, the PV power plant 90 is also connected to the collector bus 18. The first power plant control system 60 has information on the power delivery capabilities of the PV power plant 90, for example the maximum active and reactive power it can provide, and at what voltage level. The power plant control system 60 is operable to monitor the stability of the collector bus 18 by measuring the voltage at its respective substation 72. Due to a grid event somewhere on the power network 11, it is possible that the grid voltage may drop to a certain level, for example 0.9 pu. Such a voltage drop is detectable by the power plant control system 60 which includes voltage measuring device 71 integrated at the substation 72. Further voltage measuring devices may be provided at the other power plants 10, 20 and are marked on FIG. 1 by references 85 and 101, respectively. In one sense, therefore, the further voltage measuring devices may be considered to form part of the first power plant control system 60 since they provide a means for that system to monitor grid voltages at remote points. In circumstances where the first power plant 10 does not have any further capacity to increase its output of reactive power, for example where the wind turbines are at maximum capacity and where all capacitor banks are in operation, there would be a shortfall in the capability of the power plant control system 60 to support the stability of the grid by increasing reactive power supply. However, by virtue of the illustrated embodiment, the power plant control system 60 may make a determination that further reactive power and may transmit a request to another power plant on the power network in order to increase the reactive power delivery thereto. For example the power plant control system 60 may transmit a request to the power plant control system 95 of the PV plant 90 to activate its capacitor bank 106.

Here it will be appreciated that the voltage value is expressed as a 'pu' or per-unit value, which, as is known, is unit system in which quantities of an electrical system, in this case voltage, are expressed as a proportion of predefined base quantities.

From the above discussion, the reader will appreciate that this functionality enables the power plant control system 60 of the first power plant 10 to act as a 'master controller' to use assets of the other substations to add stability of the grid and meet the required control functions such as higher reactive power supply if needed.

Controlling Tap Changer Functionality of Transformers of Remote Power Plants

As has been discussed above, the substations 72,89,100 of the power plants 10,20,90 comprise transformers that include tap changer functionality so that the voltage conversion factor of said transformers can be adjusted by controlling the tap point of thereof.

Under certain circumstances, it may be necessary to increase the voltage on the power network in order to achieve a predetermined voltage control regime to help in stabilizing the grid voltage and aid voltage stability.

In the illustrated embodiment, the power plant control system 60 associated with the first power plant 10 may make a rapid decision that in those circumstances the correct approach is to adjust the tap point of the transformers in one or more of the substations connecting the power plants 10,20,90 to the collector bus 18 and can issue appropriate requests messages using the communication system 110 to one or more of the other renewable energy power plants connected to the collector bus 18 to achieve appropriate control over the respective transformers with OLTC adjustment functionality. Therefore the amount of active power delivery injected into the grid could be increased due to the increased grid stabilization support.

Controlling Entry of Other Power Plants into Low Power Production Mode

Network faults occur from time to time on a power network for numerous reasons. In the illustrated embodiment, the power plant control system 60 of the first wind power plant 10 includes equipment for determining whether a grid fault exists.

The fault detection equipment includes a Phasor Measurement Unit (PMU) 112 that is associated with the substation 72 of the first power plant 10. Such PMUs are generally known in the art and are sometimes referred to as 'synchrophasors', so a full description of such a device is not necessary here since it would be understood by a skilled person. As example of a PMU is the RES670 series of products marketed by ABB AB.

The PMU 112 is operable to measure electrical parameters associated with the wind power plant and output power delivery such as voltage and current phase angle, power angle, frequency and frequency rate of change with respect to a synchronised time base, as determined by a suitable Global Positioning System (GPS).

In addition to the PMU 112 associated with the substation 72 of the first wind power plant 10, the power plant control system 60 is also in communication with PMUs located at the second wind power plant 20 and the PV power plant 90. Thus, the substation 80 of the second power plant 20 includes a second PMU 114 and the substation 100 of the PV power plant 90 includes a third PMU 116.

Thus, a second PMU 114 is associated with the second substation 89 of the second wind power plant 20, and a third PMU 116 is associated with the third substation 100 of the PV power plant 90.

The PMUs 112-116 form a wide area monitoring system (WAMS) in communication with the power plant control system 60 of the first power plant 10. The WAMS may be defined by separate communications network infrastructure or may comprise the communication system 110, as is shown here. The power plant control system 60 of the first power plant 10 may comprise suitable functionality to interpret the data from the PMUs 112-116 in order to make control decisions based on the data received therefrom. Typically, the power plant control system 60 would include a Phasor Data Concentrator (PDC) to assimilate phasor data from the PMUs.

The presence of the PMUs 112-116 positioned at the respective substations 72,89,100 of the power plants enables the power plant control system 60 to collect, store and process critical data relating to the performance of the power network at key points therein, namely at the feeder lines which connect each of the substations to the collector bus 18. The power plant control system 60 is therefore able to use the data collected by the PMUs 112-116 to detect abnormal network conditions and take action to preserve system stability and performance. Moreover, since the power plant control system 60 is located in a neighbouring geographical area to the other power plants on the network, it is able to take action quickly to engage or disengage power generation assets of those other power plants in order to maintain system stability.

By virtue of the PMUs 112-116 associated with the feeder lines of their respective power plants, the power plant control system 60 is able to ensure the phase difference in the system between the different buses, for example, the phase angle between the first feeder line 19 and the second feeder line 86, between the first feeder line 19 and the third feeder line 102, or between the second feeder line 86 and the third feeder line 102. Since phase angle difference is an indication of the degree of power system stability of the grid, the power plant control system 60 of the first power plant 10 is able to determine rapidly the state of the system at one or more points. Moreover, since PMUs usually operate at a measurement frequency of up to 200 Hz, the power plant control system 60 can take action very rapidly to maintain system stability.

In addition to monitoring the phase difference between the PMUs 112-116 in the power network 11, the power plant control system 60 may also determine the rate of change in phase difference between two PMU measurement points. If the rate of change of phase difference is greater than a critical value, then this may indicate that there is a severe disturbance or a collapse of system stability. When a grid problem has been detected by the PMUs, the power plant control system 60 is able take the decision to send request messages to all of the power plants under its influence, in this example the second wind power plant 20 and the PV power plant 90 and command them to enter a low power production mode. Such a command form the power plant control system 60 may be configured such that the other power plants recognise it as a high priority request message that takes priority over any other operational commands from the TSO 70. Advantageously, upon detecting a critical grid condition by way of the PMUs the step of commanding all of the power plant control systems into a low power production module, for example of between 20% and 50% of the rated power of said respective power plants, can occur very rapidly, within about 100 to 120 ms, for example, such that further increases in phase differences on the grid can be avoided as will the disconnection of those power plants from the grid. So, such a response from the power plant control system 60 enhances the low voltage ride through capability of the power plants connected to the collector bus 18. This will improve a stability margin of the grid, which is particularly useful during conditions that cannot easily be detected as faults by power plants based simply on the voltage measurements at their terminals, such as remote line to ground faults.

It will be appreciated therefore that in these circumstances the power plant control system 60 is influencing directly the power plant control systems of other power plants to transition the power generation assets controlled by them into a low power production mode. Those plant control systems therefore can be considered to be devices that initiate a low power production mode in response to an appropriate request by the power plant control system 60.

Controlling Capacitor Banks to Support Increased Active Power Supply

As is well understood, the supply of reactive power to a power grid supports the delivery of active power from the power plants connected to the grid. The delivery of active power can only be increased for a given voltage by increasing also the reactive power. Attempting to drive more active power into the grid at a given voltage can have the effect of destabilizing the grid and causing the voltage to droop.

Since the power plant control system 60 of the first power plant 10 has supervisory control of the other power plants 20, 90 coupled to the collector bus 18, following demand from the TSO 70 for greater active power, the control system 60 can take appropriate action to meet the demands of the TSO 70.

For example, the active power that can be pushed onto the collector bus 18 depends in part on the voltage at each of the substations 72,89,100. During steady state operation, if the power plant control system 60 receives a command from the TSO 70 for a temporary increase in active power, it may not have the ability to drive this demand based on the operation of its own power generation assets. Therefore the power plant control system 60 may determine that power compensation assets of other ones of the power plants connected to the collector bus 18 may be operated in order to satisfy the demand for extra power delivery. In this case, the power plant control system 60 may send a request message to either or both of the power plant control system 80 of the second wind power plant 20 and the power plant control system 95 of the PV power plant 90 in order to operate their respective capacitor banks and therefore achieve a boosted voltage on the collector bus 18.

Figure 3:
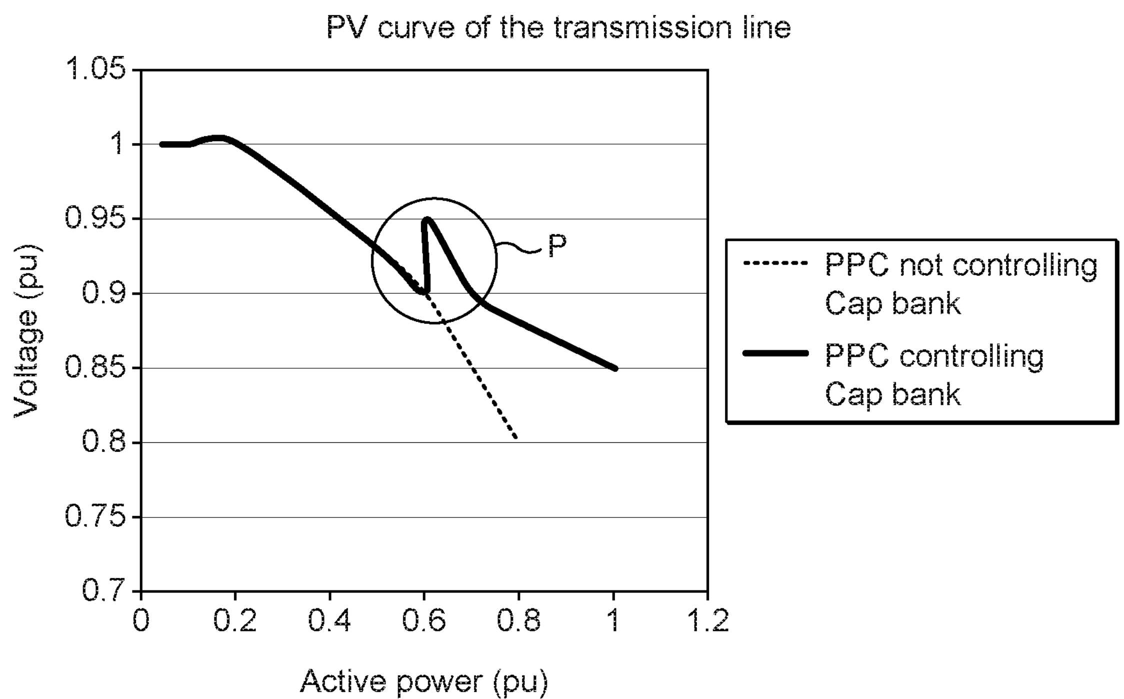
FIG. 3 is a plot that illustrates the effects of a power plant control system carrying out a response to stabilize grid stability.

This can be seen in FIG. 3, in which the voltage, as shown on the vertical axis, drops to 0.9 pu as the active power is increased, whereupon the power plant control system 60 commands operation of the capacitor banks of the other power plants 20, 90 at point P which improves the voltage profile of the collector bus 18 which means that more active power can be pushed into it. The skilled person will appreciate that an increase in active power on the transmission line will also increase the reactive power losses. This increased reactive power losses, unless counteracted by suitable grid control, tends to cause the grid voltage to drop, as shown by the dotted line in FIG. 3. If local reactive support from a nearby substation is available, and as can be controlled by the power plant control system 60 acting as a master controller, the current equivalent to the reactive power loss is available for more active power flow, which increases the active power capability of the line.

Figure 4:
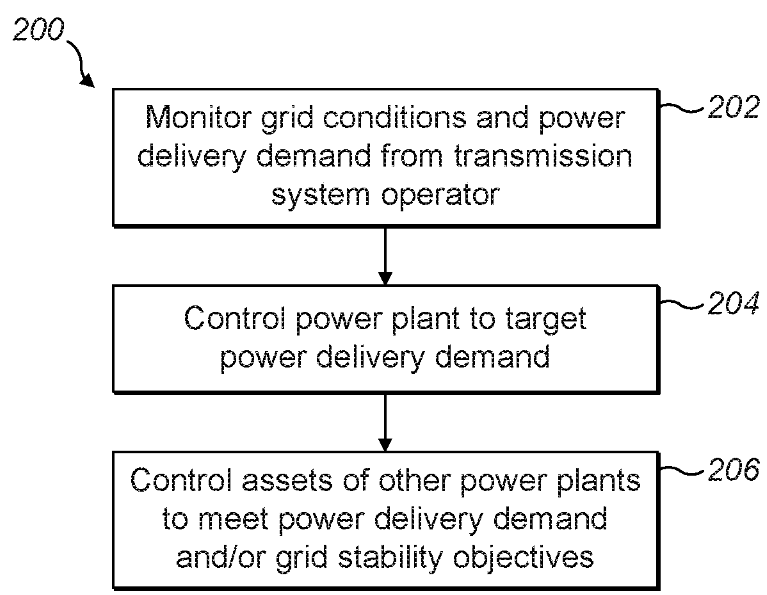
FIG. 4 is a process flow chart depicting a method according to an embodiment of the invention.

The scenarios discussed above explain specific circumstances where the embodiments of the invention are envisaged to be particularly useful. However, the skilled person will appreciate that the inventive concept is not limited to those specific circumstances. FIG. 4 illustrates embodiments of the invention as a process 200 performed by the power plant control system 60 of FIG. 1 and as is embodied by the specific situations discussed above. At step 202, the power plant control system 60 receives a power delivery demand from the TSO 70 and monitors grid conditions. At step 204, the power plant control system 60 then controls its power generation assets i.e. its wind turbines 12, reactor bank 74, capacitor banks 76 and OLTC transformer 78 in order to target the demanded power delivery from the TSO 70. If the power plant control system 60 determines that it cannot, by itself, meet the power delivery demand, or if it detects a grid instability issue, it is operable at step 206 to control the power compensation assets of other power plants in the power network in order to meet the power delivery demand of the TSO 70 or to tackle grid stability objectives.

It will be appreciated that various modifications may be made to the specific embodiments discussed above without departing from the inventive concept, as defined by the claims. For example, in the above power network 11 each of the power plants 10, 20 and 90 are connected to the same collector bus 18. However, this need not be the case and alternative power network configurations are envisaged in which the power plants may not be connected to a common collector bus, but may instead be connected to the transmission line individually.

The invention claimed is:

1. A power plant control system for a first renewable energy power plant comprising one or more renewable energy generators, the power plant control system comprising:

receiving means for receiving a power delivery demand from a transmission grid operator;

control means configured to control the one or more renewable energy generators of the first renewable energy power plant so as to supply power that targets the received power delivery demand, wherein the first renewable energy power plant and one or more further renewable energy power plants are coupled to a common collector bus, and wherein the common collector bus is coupled to a grid;

voltage detection means configured to detect a voltage drop in the grid; and communication means configured to transmit, in response to the voltage drop in the grid, a request to one or more power compensation units of the one or more further renewable energy power plants to increase a power production of the one or more further renewable energy power plants to the grid over the common collector bus.

2. The power plant control system of claim 1, wherein the first renewable energy power plant comprises power compensation units and wherein the power plant control system is operable to control said power compensation units.

3. The power plant control system of claim 1, wherein the communication means includes an energy management network that permits communication between the power plant control system of the first renewable energy power plant, and respective power plant control system of the one or more further renewable energy power plants.

4. The power plant control system of claim 1, wherein the first renewable energy power plant and the one or more further renewable energy power plants are coupled to the common collector bus by respective feeder lines.

5. The power plant control system of claim 1, wherein the one or more further renewable energy power plants includes a wind energy power plant and a photo-voltaic power plant.

6. The power plant control system of claim 1, wherein the one of more power compensation units are one or more of the following: a capacitor bank; a reactor bank; a static compensator (STATCOM), an online tap changer transformer, and a device for initiating low power production mode of an associated power plant.

7. The power plant control system of claim 6, including voltage detection means comprising at least a first voltage measuring device for measuring the voltage at the first renewable energy power plant and one or more further voltage measuring devices for measuring voltages at respective ones of the further renewable energy power plants.

8. The power plant control system of claim 7, wherein the power plant control system is operable to monitor voltages at each of the one or more further renewable energy power plants; monitor an active power demand from the transmission grid operator; and send a request message via the communication means to one or more of the further renewable energy power plants to activate capacitor banks associated therewith.

9. The power plant control system of claim 7, wherein the power plant control system is operable to monitor the voltage at the first renewable energy power plant; to detect a low voltage event; and, in response, to send a request message via the communication means to one or more of the further renewable energy power plants to activate capacitor banks associated therewith.

10. The power plant control system of claim 7, wherein the power plant control system is operable to monitor voltages at each of the one or more further renewable energy power plants; monitor an active power demand from the transmission grid operator; and send a request message via the communication means to one or more of the further renewable energy power plants to change a tapping point of respective online tap changer transformers associated therewith.

11. The power plant control system of claim 1, including phasor measurement means comprising at least a first phasor measurement unit for measuring electrical phasor parameters at the first renewable energy power plant and one or more further phasor measurement units for measuring electrical phasor parameters at respective ones of the further renewable energy power plants.

12. The power plant control system of claim 11, wherein the power plant control system is operable to monitor the phasor measurement means, to determine the presence of a grid fault, and in response to send a request message via the communication means to one or more of the further renewable energy power plants to initiate a low power production mode of power generation units associated therewith.

13. A method of operating a first renewable energy power plant, comprising:

receiving a power delivery demand from a transmission grid operator;

controlling one or more renewable energy generators of the first renewable energy power plant so as to supply power that targets the received power delivery demand, wherein the first renewable energy power plant and one or more further renewable energy power plants are coupled to a common collector bus, and wherein the common collector bus is coupled to a grid;

detecting a voltage drop in the grid; and transmitting, in response to the voltage drop in the grid, a request to one or more power compensation units of the one or more further renewable energy power plants to increase a power production of the one or more further renewable energy power plants to the grid over the common collector bus.

14. A power supply system, comprising:

a first renewable energy power plant including one or more renewable energy generators and a power plant control system; wherein the power plant control system comprises:

a controller configured to control the one or more renewable energy generators of the first renewable energy power plant so as to supply power that targets a power delivery demand received from a transmission grid operator, wherein the first renewable energy power plant and one or more further renewable energy power plants are coupled to a common collector bus, and wherein the common collector bus is coupled to a grid;

a detector configured to detect a voltage drop in the grid; and a communication interface configured to transmit, in response to the voltage drop in the grid, a request to one or more power compensation units of the one or more further renewable energy power plants to increase a power production of the one or more further renewable energy power plants to the grid over the common collector bus.

15. The power supply system of claim 14, wherein the first renewable energy power plant comprises power compensation units and wherein the power plant control system is operable to control said power compensation units.

16. The power supply system of claim 14, wherein the communication interface includes an energy management network that permits communication between the power plant control system of the first renewable energy power plant, and respective power plant control system of the one or more further renewable energy power plants.

* * * * *